Figure 1:
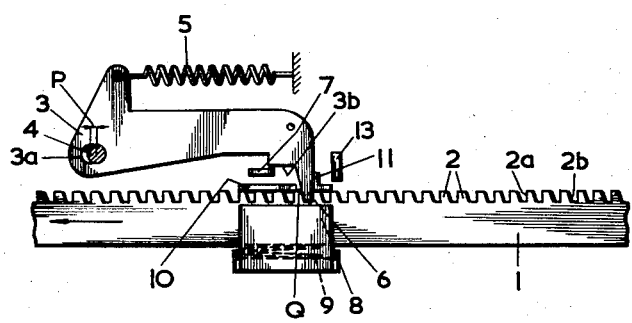

United States Patent [19]

Kosters

[11] 3,757,923

[45] Sept. 11, 1973

[54] SILENCER FOR ELIMINATING NOISE CAUSED BY A PAWL ON A GEAR RACK WHEN THE GEAR RACK IS RETURNED TO A INITIAL POSITION

[76] Inventor: Paul L. M. Kosters, 3 Hazenputten, St. Oedenrode, Netherlands

[22] Filed: June 25, 1971

[21] Appl. No.: 156,877

[52] U.S. Cl. .................................. 197/94, 197/70
[51] Int. Cl. ............................................ B41j 19/66
[58] Field of Search .................. 197/70, 82, 84 R, 197/92, 94, 95, 96

[56] References Cited
UNITED STATES PATENTS

| 3,441,119 | 4/1969 | Schweizer | 197/94 |
| 441,197 | 11/1890 | Schuckers | 197/94 X |
| 1,162,508 | 11/1915 | Petermann | 197/70 |
| 1,174,696 | 3/1916 | Dean | 197/94 X |
| 1,437,520 | 12/1922 | Holden | 197/70 |
| 2,710,088 | 6/1955 | Sharpe | 197/70 |
| 2,815,109 | 12/1957 | Demmel et al. | 197/84 R |
| 2,913,091 | 11/1959 | Neumann | 197/82 |
| 3,385,415 | 5/1968 | Schrader et al. | 197/84 R |
| 3,455,429 | 7/1969 | Schweizer | 197/84 R |

Primary Examiner—Ernest T. Wright, Jr.
Attorney—Thomas P. Murphy et al.

[57] ABSTRACT

A structure disposed on a gear rack for preventing the point of a carriage control pawl from sliding over the teeth of the gear rack during carriage return.

4 Claims, 2 Drawing Figures

Patented Sept. 11, 1973

3,757,923

INVENTOR
PAUL L. M. KOSTERS

BY *Thomas P. Murphy*
ATTORNEY

SILENCER FOR ELIMINATING NOISE CAUSED BY A PAWL ON A GEAR RACK WHEN THE GEAR RACK IS RETURNED TO A INITIAL POSITION

The invention relates to a silencer, especially for the rapid movement in the return direction of the carriage of a typewriter or the like, which carriage is provided with a gear rack which is axially slidable and which in the printing direction is loaded by a spring, whereby the corrugated teeth of the gear rack can cooperate with an articulated pawl, the point of which can engage into the teeth and can be lifted from the teeth.

There is known a typewriter, whereby the carriage can jump every time over a space by means of such an escapement mechanism. If for instance a line has been filled up with letters or symbols, the carriage has to return quickly. In certain typewriters the point of the pawl rattles over the tops of the teeth of the gear rack during carriage return. This is inconvenient, especially when more typewriters or the like are used in the same room. Moreover, this rattling causes an unnecessary wear of the point of the pawl and the gear rack.

The invention aims to provide a silencer, by which during rapid return movement of the carriage this rattling is completely prevented.

This is achieved according to the invention by means of a silencer which is formed by a member which is frictionally slidable along the gear rack with one part of the member being disposed along the tops of the teeth of the gear rack. The point of the pawl engages into and out of the teeth of the gear rack through an opening in the member during escapement.

During return of the carriage a portion of the member moves between the teeth of the gear rack and the point of the pawl to prevent the pawl point from rattling along the tops of the teeth.

Preferably the member is box-shaped with two open sides for passing the gear rack therethrough. The frictionally slidable connection between the member and the gear rack is effected by a spring arranged within the member, which resiliently holds a wall of the member against the tops of the teeth of the gear rack.

Figure 2:
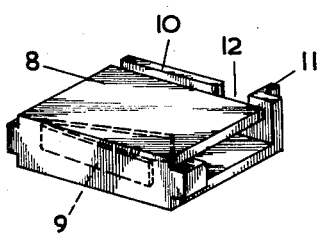

The invention will now be described with reference to the drawing, in which:

FIG. 1 shows in a top view a gear rack with a pawl mechanism of the carriage of a typewriter, with the silencer according to the invention, and FIG. 2 is a perspective view of the silencer.

The gear rack 1 of the carriage of a typewriter is in the known way provided with corrugated teeth 2. The teeth 2 have steeper flanks 2a and more oblique flanks 2b, which permit the teeth 2 to cooperate with an articulated pawl 3, which via an oblong hole 3a is rotatable around a pin 4 and is loaded by a spring 5. Due to the oblong hole 3a the pawl 3 can move to and fro over a short distance P. The point 6 of the pawl 3 engages into the teeth 2 of the gear rack 1, which moves in the direction of the arrow under influence of a spring (not shown). However the steeper right flank of the point 6 normally prevents movement of the gear rack 1 by engaging the steeper flank 2a of one of teeth 2 of the gear rack 1. At this time the pin 4 lies in the right hand part of the oblong hole 3a.

During a printing operation the escapement lifter 7 is raised causing the pawl 3 to be turned in the anticlockwise direction around the pin 4 and lifted from the teeth 2 in oppositition to the tension spring 5. The pawl 3 moves now somewhat to the right, so far as is permitted by the oblong hole 3a, so that the cam 3b of the pawl 3 comes free from the lifter 7 and the point 6 will arrest the next tooth 2, because the gear rack 1, has been moved to the left over a space after printing a symbol.

During carriage return the point 6 is cammed out of engagement from the teeth 2 by the more oblique flank 2b with which it is engaged. Without the present invention the point 6 would rattle over the tops of the teeth 2, which causes an inconvenient rattling noise.

Such an escapement mechanism is known per se. The silencer according to the invention consists of a box-shaped member 8 with two open sides. This member 8 is slidable along the gear rack 1. In the box-shaped member 8 a double folded leaf spring 9 or the like is enclosed, which presses resiliently the side 10 of the member 8 against the tops of the teeth 2. This side 10 is provided with a projection 11, which has been formed as by cutting out a portion, which portion has been bent outwards in a perpendicular direction to provide an opening 12. It will be clear, that by the resilient pressing of the spring 9 the member 8 tends to move to the right along with the gear rack 1 during carriage return. Since the point 6 engages one of the teeth 2 through the opening 12 in the wall 10, it is cammed out as a result of the fact the left flank of the point 6 is oblique. When this happens the pawl 3 is rotated around the pin 4 and the point 6 will come to rest on the outer side of the wall 10 of the member 8 free of the teeth 2. The point 6 lies with a clearance Q in the opening 12, whereby Q<P. Thus the gear rack 1 can move quickly to the right without rattling noise. Obviously the member 8 is only allowed to move to the right along with the gear rack 1 over a very short distance. A fixed stop 13 cooperating with the projection 11 prevents the member 8 from moving more than a few millimetres. Instead of this fixed stop 13 also on the outer side of the wall 10 a stop could be arranged, cooperating with the left flank of the point 6.

When the gear rack 1 is moved again to the left, the member 8 moves again along with the gear rack 1 causing the point 6 to come free from the wall 10 and fall again into the opening 12. Further movement of the member 8 to the left is prevented, in that the projection 11 arrests against the steeper right flank of the point 6. If the gear rack 1 moves to the left according to a space the member 8 does not further function.

With the rather simple and thus cheap box-shaped member 8 a very effective noise damping is obtained, which can also be used in other fields, namely where a gear rack is moved quickly in one direction and is moved stepwise in the other direction.

What is claimed is:

1. In a typewriter, a gear rack spring biased to move a carriage in a printing direction, the gear rack having a series of gear teeth, pawl means having a point biased to engage the gear teeth of the gear rack to prevent movement of the gear rack in the printing direction, the point and each of the gear teeth having cam surfaces for removing the point from the gear teeth by movement of the gear rack in a non-printing direction during carriage return, the improvement comprising:

a member mounted on said gear rack, and having a first side, said member responsive to movement of the gear rack in the non-printing direction to slide said first side along a path between the point and said gear teeth to prevent said point from sliding over the gear teeth during carriage return, said first side having an inner surface contiguous to a top portion of said gear teeth, spring means coupled between said member and said gear rack providing frictionally slideable engagement between said first side and said gear teeth for causing said member to move with said gear rack, and stop means disposed in the path of said member for stopping said member after a short distance during carriage return causing said first side to slide between said point and said gear teeth during carriage return, said first side having an opening to permit said point to engage said gear teeth, and a projection disposed on one side of said opening between said point and said stop means for engaging said stop means during carriage return, said projection engaging said point to maintain said member stationary relative to said point as said point moves in and out of said opening during printing operations.

2. In a typewriter according to claim 1 wherein said member comprises:

a second side opposite said first side, said spring means disposed between said second side and a side of said gear rack opposite said gear teeth with a force to permit said member to slide relative to said gear rack upon engagement of said projection with said stop means or said point, third and fourth sides forming together with said first and second sides a box-shaped element having open ends for passing said gear rack therethrough, said opening being formed by a cut out on said first side bent clockwise to a perpendicular position relative to said first side, said bent cut out forming said projection.

3. An arrangement for preventing a point of a typewriter carriage control pawl from contacting a gear rack during carriage return, comprising in combination, a gear rack biased to move in a printing direction, said gear rack having a series of gear teeth, pawl means having a point biased to engage one of the teeth of the gear rack to prevent movement of the gear rack, means associated with said pawl means for removing said point from said teeth for each printing operation, a member slidably mounted on said gear rack having a first side with an inner surface contiguous to a top of a portion of the teeth of said gear rack, said member including spring means causing said inner surface to frictionally engage said top portion of said gear teeth to cause said member to move with said gear rack, said first side having an opening through which said point engage said gear teeth, said point and each of said gear teeth having cam surfaces for removing said point from said gear teeth by movement of said gear rack in a non-printing direction during carriage return, stop means disposed along a path of said member, a projection disposed on one side of said opening between said point and said stop means for engaging said stop means during carriage return to cause said first side to slide between said point and said gear teeth, said projection engaging said point to maintain said member stationary relative to said point as said point moves in and out of said opening during printing operations.

4. An arrangement according to claim 3 wherein said member further comprises:

a second side opposite said first side, said spring means disposed between said second side and a side of said gear rack with a force to permit said member to slide relative to said gear rack upon engagement of said projection with said stop means or said point, third and fourth sides forming together with said first and second sides a box-shaped element having open ends for passing said gear rack therethrough, said opening being formed by a cut out on said first side bent clockwise to a perpendicular position relative to said first side, said bent cut out forming said projection.

* * * * *